United States Patent [19]
Underwood

[11] Patent Number: 5,517,426
[45] Date of Patent: May 14, 1996

[54] APPARATUS AND METHOD FOR ADAPTIVE CLOSED LOOP CONTROL OF SHOCK TESTING SYSTEM

[76] Inventor: Marcos A. Underwood, 21850 Byrne, Cupertino, Calif. 95014

[21] Appl. No.: 396,344

[22] Filed: Feb. 27, 1995

Related U.S. Application Data

[63] Continuation of Ser. No. 968,587, Oct. 29, 1992, abandoned.

[51] Int. Cl.⁶ .................................................. G01M 7/00
[52] U.S. Cl. ..................... 364/508; 364/221.1; 364/553
[58] Field of Search ............................... 364/165, 221.4, 364/508, 553, 724.19, 574, 395, 148, 151, 158, 221.1, 221.3; 73/577, 579; 324/615

[56] References Cited

U.S. PATENT DOCUMENTS

| | | | |
|---|---|---|---|
| 4,181,029 | 1/1980 | Talbott, Jr. ................................. | 73/665 |
| 4,537,076 | 8/1985 | Lax et al. ................................... | 73/662 |
| 4,914,564 | 4/1990 | Surauer et al. .......................... | 364/148 |
| 4,991,107 | 2/1991 | Sloane ...................................... | 364/508 |
| 5,206,911 | 4/1993 | Eriksson et al. ......................... | 381/71 |
| 5,245,552 | 9/1993 | Andersson et al. ..................... | 364/508 |
| 5,299,459 | 4/1994 | Underwood ............................. | 364/508 |

FOREIGN PATENT DOCUMENTS

WO91/18271  11/1991  WIPO .............................. G01M 7/00

OTHER PUBLICATIONS

Daniel Sheingold, Transducer Interfacing Handbook, Mar. 1980, pp. 14, 15, 197, and 198.
Graham Brown, Instrumentation and Control Systems Engineering Handbook, Dec. 1978, pp. 227–235.
J. D. Favour, a Boeing Aerospace Company paper, "Transient Waveform Control—A Review of Current Techniques," presented at the 20th Annual Meeting of the Institute of Environmental Sciences in Washington, D.C., Apr. 1974, pp. cover, and 1–25.
Brochure for the GR2530 device, "Shock Transient Waveform Shaker Control Software," developed by GenRad, four pages in length.
Product Description manual, "2518 Vibration Control Systems," developed by GenRad, Jun. 1990, Sections 1–12, 54 pages in length.
Richard C. Dorf, Modern Control Systems, copyright 1967, Chapter 1, "Introduction to Control Systems," p. 2.

Primary Examiner—Emanuel T. Voeltz
Assistant Examiner—Craig Steven Miller
Attorney, Agent, or Firm—Limbach & Limbach

[57] ABSTRACT

An apparatus and method for adaptively updating the drive signal in a shock testing system so as to produce a desired response signal. The updates to the drive signal are based on measurements of the system's actual response signal and closed loop updates to the test system's transfer function. An initial estimate of the test system transfer function is obtained by using a calibration signal as the drive signal and measuring the response signal. An initial estimate of the actual drive signal is then obtained based on the desired response signal and the initial estimate of the transfer function. The initial estimate of the drive signal is then applied to the test system, and the actual response signal is measured. The present invention then adaptively updates the test system transfer function. The updated transfer function is then used with the drive signal and response signals to determine a coherence function which provides an estimate of the convergence of the estimate of the transfer function to the actual transfer function for the test system. The previous estimate for the drive signal and the current estimates for the transfer function and coherence function are then used to determine an updated drive signal. This sequence is repeated until the drive signal is produces a response signal which is acceptably close to the desired response signal.

36 Claims, 5 Drawing Sheets

APPARATUS AND METHOD FOR ADAPTIVE CLOSED LOOP CONTROL OF SHOCK TESTING SYSTEM

This is a File Wrapper Continuation application of co-pending application Ser. No. 07/968,587 filed on Oct. 29, 1992, now abandoned.

TECHNICAL FIELD

The present invention is generally directed to vibrational test systems used to determine the response of a device under test to transient vibrations, and more specifically, to an apparatus and method for performing closed-loop updates to the drive signal applied to an exciter which imparts a transient vibration to the device under test, in a manner which compensates for changes in the dynamics of the test system which occur during the test.

BACKGROUND OF THE INVENTION

Vibrational testing of structures and devices provides a means of evaluating their ability to operate properly when subjected to a wide range of driving forces. In a typical test situation, a drive signal is used to control the motion of an exciter, with that motion being transferred to the device under test by the coupling of the exciter and device at a control point. A control system may be used to vary the drive signal in an effort to produce a desired excitation signal (also known as the desired response signal), where this signal is measured by a transducer or other sensor placed at some point on the test device. This transducer, referred to as a control transducer, produces a voltage waveform that is proportional to a physical unit used to represent the desired signal waveform. This desired signal waveform is usually represented in terms of physical motion units appropriate to the acceleration, velocity, or displacement units of the desired response signal. These physical units are converted to the equivalent voltage units by using the calibration factor for the chosen transducer, where the calibration factor is usually expressed in terms of engineering units per voltage. The result is the voltage representation of the desired response signal, which can then be compared with the actual voltage waveform produced by the transducer, in response to the applied drive voltage waveform. The drive signal may require modification in order to produce the desired response signal. One reason for this may be due to the time-varying or non-linear behavior of the test system's transfer function which relates the drive signal voltage waveform (input) to the response signal voltage waveform (output). To simplify, the following description of the subject invention, reference will be made to the actual response signal of the device under test and the desired response signal of the same device under test, in terms of their respective voltage representations. It will be assumed that the reference or desired response signal has been converted into its equivalent voltage representation by multiplying its engineering units representation by the appropriate transducer calibration factor for the chosen control transducer, which is in terms of voltage per engineering units. This allows the following discussion of the transfer function ratios to be expressed in terms of a unitless representation of response voltage per drive-volts.

Sinewave, Random, and Shock Testing

Several distinct types of vibrational testing are commonly used, with the types distinguished by the nature of the driving signals which are applied to the device under test. Sine testing involves the application of steady-state and swept sine waves to a device. This type of testing is useful for studying the dynamic properties of a device and determining its resonant frequencies. However, sine testing is of limited utility because in typical operating environments the vibrations which a device is subjected to are not periodic in time and have a continuous (as opposed to discrete) frequency spectrum.

For this reason another type of vibration testing, termed random testing, was developed. Random testing subjects a test device to a broad band of excitation frequencies whose amplitudes are continually changing. This type of vibration test simultaneously excites multiple vibrational modes in the device under test, providing a closer approximation to the operating conditions which are typically encountered.

A limitation to the usefulness of both sine and random vibrational testing can arise in situations where neither type of test accurately reproduces the vibration spectrum which would be encountered. Explosions, earthquakes, and crashes are characterized by a sudden, transient impulse which is difficult to simulate by either sine or random vibration testing. For this reason, a third type of vibrational testing, termed shock testing, was developed.

Shock testing determines whether a test device can remain operational and maintain its structural integrity when subjected to a transient vibration. This type of test environment is usually simulated by applying a time domain signal (a waveform characterizing the applied acceleration) to a device under test. Updating of the drive signal (if desired) is usually performed in the frequency domain in order to facilitate the computations involved.

Open Loop/Closed Loop Control Systems

The variation of the drive signal applied to a test system (where the test system includes the exciter, device under test, and any associated equipment), for the purpose of producing a desired response signal, is performed by a control system. Two types of control systems are typically used in vibration testing systems. Open loop systems use a controller in an effort to obtain a desired response signal, and do not automatically update the drive signal input to the test system based on the response signal. Closed loop systems use a feedback mechanism to update the drive signal, where the update is based on a comparison between the actual response signal and a desired or ideal response signal. The product of the comparison is known as an error signal.

An example of a typical control system suitable for use in vibration testing is the GR2518 Vibration Control System (as described in the product description manual dated June, 1990) manufactured by the Structural Test Products Division of GenRad, Inc., Milpitas, Calif. This control system can perform swept sine, random, or shock testing of a test system. The system is a computer controlled, closed loop control system which performs drive signal synthesis, vibration testing and data analysis functions.

A discussion of several methods by which digital computers and Fourier transform technology are used to control transient waveforms during vibration testing is found in the article "Transient Waveform Control—A Review of Current Techniques" by John D. Favour, presented at the 20th Annual Meeting of the Institute of Environmental Sciences, held in Washington, D.C., April, 1974. It is believed that this article discusses both open loop and closed loop control of the drive signals used to generate transient waveforms, however, adaptive, closed loop updating of a test system's transfer function is not discussed.

Both the Genrad GR2518 Vibration Control System and the closed loop control shock testing systems disclosed in the above referenced article update the drive signal based on a predetermined estimate of the transfer function which is not adaptively updated as the shock test is run. Thus, even though such systems are capable of updating the drive signal, they do so based on an error signal and a constant estimate of the transfer function. This means that non-linearities in the system's response (the variation of the transfer function with the amplitude of the drive signal) and time variations in the system dynamics are not accounted for. This can produce situations where the drive signal fails to converge to one which produces the desired response signal. This can occur because the drive signal updates are very sensitive to errors in, or computational problems created by, the estimate of the transfer function which is being used.

Control systems normally operate on signals which are represented in the frequency domain. The transient response of a system is determined by the zeros or roots (the poles) of the transfer function. Determining the frequencies which correspond to those zeros or roots allows the transient response of the system to be characterized. However, the frequencies corresponding to the zeros or roots can be difficult to determine by standard computational methods because infinities may be introduced into the calculation. The general form of the transfer function may also be difficult to determine if the amplitude of the drive or response signal is small for a certain frequency or range of frequencies.

An open or closed loop control system can avoid these computational problems if it is provided with an estimate of the linear and time independent response of a system. This estimate of the transfer function can either be used throughout the testing sequence or it can be regularly updated to relate the input (the drive signal) to the output (the response signal). In this case the control system performs closed loop updates of the drive signal, based on open loop adjustments to the transfer function.

An update to the response characteristics of the exciter and test device assists the control system to modify the drive signal in a manner designed to produce the desired acceleration profile at the control point. Adaptively updating the transfer function is desirable because the inertial and structural characteristics of the test system may vary during the test, and this can alter the acceleration profile which is imparted to the device under test upon application of a given drive signal. In vibration tests using sine or random drive signals, such an update can be accomplished by means of an open loop or closed loop control system because the drive signal is of sufficient duration that a steady-state response can be obtained after adjustments are made to the transfer function.

However, in shock testing it is the response of the test system to a transient impulse which is measured, and thus the results are sensitive to the real-time transient characteristics of the test system. For this reason it is desirable, in accordance with the present invention, to modify the drive signal based on closed loop adaptive updates to the test system transfer function in order to compensate for variations in the response characteristics of the test system which occur during the test. Current open and closed loop control systems used in shock vibration testing do not perform closed loop updates to the transfer function. This failure to update the transfer function can make the control system susceptible to divergence, i.e., the drive signal will fail to converge to its desired form, if the characteristics of the test system change significantly during the test.

In conventional shock test systems, a drive signal is applied to a combination of elements which are characterized by a transfer function, and a response signal is measured by a transducer located at a point on the device under test. The response signal is representative of the vibrational motion imparted to the device at the control point. In order to efficiently modify the drive signal so as to reproduce the desired response signal at the transducer, it is desireable to determine the form of the test system's transfer function.

An initial value for the transfer function can be obtained by driving the test system with a known calibration drive signal (which in some cases is chosen to be a white noise signal), measuring the response, and from that inferring an estimate for the transfer function. This approach is commonly used in sine and random vibration testing, and can be utilized with such tests in the context of an open or closed loop control system. The calibration signal typically contains a mixture of frequency components and therefore does not preferentially excite any vibrational modes of the test system. Using a calibration signal to determine the initial estimate of the transfer function also removes many of the computational difficulties which can arise if the amplitude of the drive signal is zero or very small for some frequencies. The use of a calibration signal thus provides a good standard for comparing the transfer functions of different systems. If an updated value for the transfer function is desired (for example, because it is believed that the impedance of the system may have changed during the test), the test is stopped and another estimate of the transfer function is made by the same method.

This method of updating the test system transfer function is undesirable when used in the context of shock testing systems for at least two reasons. In order to update the transfer function, the test sequence must be interrupted. This increases the time it takes to conduct a shock test and requires that care be taken so as not to exceed the response limits of any other part of the test system as a result of exciting the system with the calibration signal.

The method is also undesirable because the use of a calibration drive signal does not produce an accurate estimate of the test system's transfer function. The magnitude of the high frequency components of calibration signals which are typically used are very different from those present in the drive signals used in shock testing. Thus, the use of such a calibration signal can fail to excite the same modes in a device under test at similar or comparable response levels as would be excited through the use of drive signals commonly used in shock testing. This is not a realistic test environment, and so the transfer function inferred by this method is not a good representation of the actual response characteristics of the test system.

What is desired is an apparatus and method for updating the drive signal in a shock testing system in a manner which can be implemented by means of a closed loop control system, and which is based on adaptive updates to the test system's transfer function.

SUMMARY OF THE INVENTION

The present invention is directed to an apparatus and method for updating the drive signal used in a shock testing system based on measurements of the system's actual response signal and adaptive closed loop updates to the test system's transfer function. An initial estimate of the transfer function is obtained by using a calibration signal, such as a white noise source, as the drive signal and measuring the response signal produced at a point on the device under test. An initial estimate of the drive signal is then obtained based on a desired response signal and the initial estimate of the transfer function.

The initial estimate of the drive signal is then used to drive the test system, and the actual response signal is measured. The present invention then adaptively updates the transfer function, which is defined in terms of the previous transfer function and the current values of the measured response signal and drive signal, both of which are operation upon in terms of their voltage representation in order to simplify the ensuing discussion. The updated transfer function is then used with the current drive signal and response signal to determine a coherence function which provides a measure of the convergence of the current estimate of the transfer function to the test system's actual transfer function as determined from the drive and response signals.

The process of updating the test system's transfer function and the coherence function includes a step which "conditions" some of the terms used to determine the updated values. This conditioning places limitations on the range of values which the terms can take, and assists with preventing the divergence of the control system in situations in which the amplitude of particular components of the drive or response signals are small or below the noise floor of the system.

The current drive signal is then used with an error signal, which is a measure of the difference between the measured response signal and the desired response signal, and the updated estimates of the transfer function and coherence function to determine an updated drive signal. This sequence is repeated in a closed loop cycle until the drive signal is updated to a value which produces a response signal which is acceptably close to the desired response signal, where this signal has been converted to its equivalent voltage representation by use of the control transducer's calibration factor, as discussed previously.

Further objects and advantages of the present invention will become apparent from the following detailed description and accompanying drawings.

DESCRIPTION OF THE PREFERRED EMBODIMENT

Figure 1:
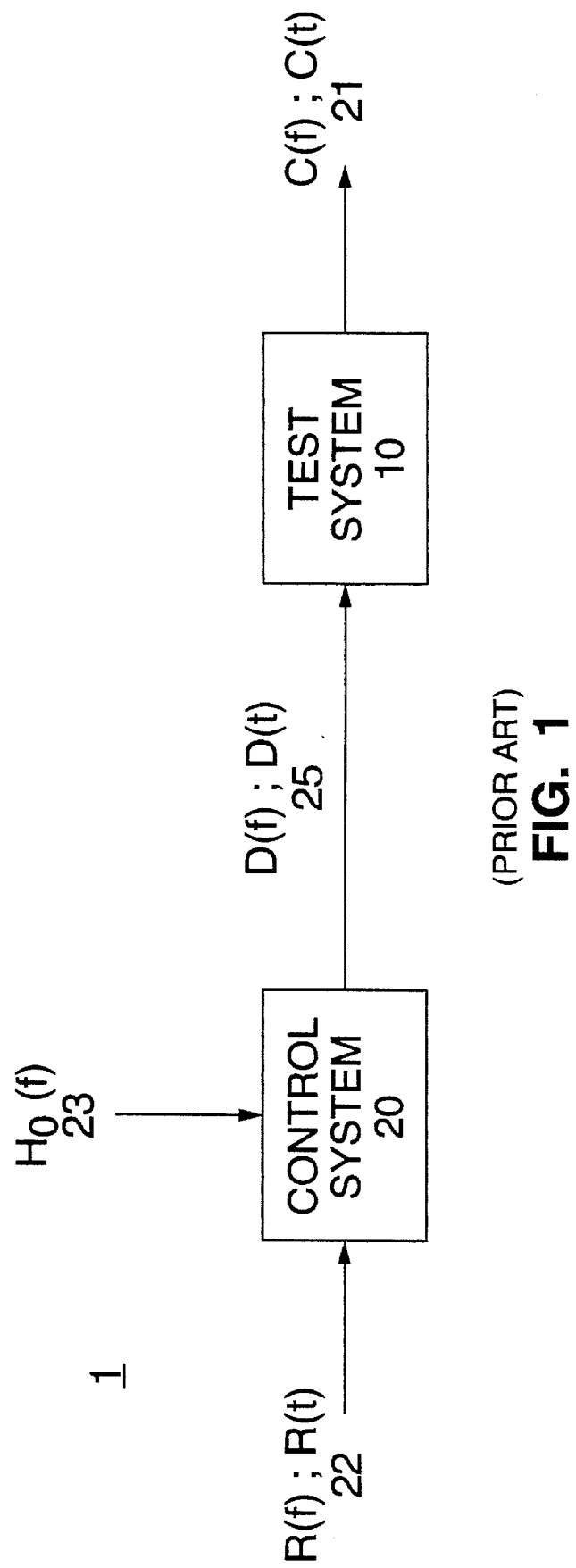
FIG. 1 is a block diagram of a prior art open loop system suitable for performing vibration testing of a device under test.

Referring to the drawings, and in particular to FIG. 1, there is shown a block diagram of a prior art open loop test system i suitable for performing vibration testing of a device under test, contained within test system 10. Vibration testing system 1 includes a control system 20 which generates as an output a drive signal 25. Drive signal 25 may be expressed in either the time domain as D(t), or in the frequency domain as D(f). In the usual case the signal applied to test system 10 is a time domain waveform, so that if a frequency domain signal is output by control system 20 (as is typically the case), it must be converted to a time domain signal.

Drive signal 25 is input to test system 10 producing response signal 21 as an output. Response signal 21 can be expressed in either the time domain as C(t), or in the frequency domain as C(f), although if drive signal 25 is input to test system 10 as a time domain signal, response signal 21 is also measured as a time domain voltage waveform signal. The frequency domain representations of response signal 21 and drive signal 25 are related to each other by the transfer function H(f) of test system 10, which is typically expressed in the frequency domain. If the response of test system 10 is linear and time-independent, this relationship may be expressed as:

$$H(f)=C(f)/D(f). \tag{1}$$

The inputs to control system 20 are a desired response signal 22, expressed in the time domain as R(t), or in the frequency domain as R(f), and an initial estimate of the test system transfer function 23, expressed in the frequency domain as $H_o(f)$. R(f) and R(t) are Fourier Transform pairs, and are expected to be expressed in terms of their equivalent voltage representation. This is achieved by pre-multiplying the engineering unit representation of R(t) by the control transducer's calibration factor, as discussed previously. This allows R(f) to be compared directly to the response signal $C(f)_i$, since $C(f)_i$ is obtained as the Fourier Transform of $C(t)_i$, which is provided as a voltage waveform by the control transducer. This convention regarding the units allows the transfer function ratio, given by equation (1), to be expressed as a unitless voltage ratio, since the quantities appearing in (1), C(f) and D(f), are then expressed in terms of voltage units. This form of discussing the variables involved, in terms of equivalent voltages, is well known in literature discussing the control and instrumentation of vibration tests. The desired response signal can be obtained from actual measurements of the effect of a particular shock source on the test system, or it can be generated by other means, such as computer modeling of the desired response signal amplitude as a function of frequency. Initial transfer function 23 is usually obtained from a separate source, such as by using a calibration or white noise drive signal. Initial transfer function 23 is used by control system 20 as the basis for determining the initial value $D_o(f)$ for drive signal 25, where $D_o(f)$ is found from:

$$D_o(f)=R(f)/H_o(f). \tag{2}$$

In FIG. 1 test system 10 represents the device under test and the associated elements which respond to drive signal 25 and act to apply the drive signal to the device. Applying the drive signal to the device is usually accomplished by means of an actuator or exciter, where the actuator couples the drive signal to a control point on the device. Test system 10 may also include transducers, associated amplifiers or other equipment not part of control system 20. It is the transducers and amplifiers that convert the physical motion associated with a response signal to its equivalent voltage waveform representation. This representation is then used by control system 20.

Test system 1 of FIG. 1 is termed an "open loop" system because it does not update drive signal 25 based on a comparison between response signal 21 and desired response signal 22. Open loop testing system 1 is also non-adaptive because it relies upon the initial estimate, $H_o$, of transfer function 23 to characterize the dynamics of test system 10 during the test, i.e., it does not update the transfer function during the vibration testing sequence.

Figure 2:
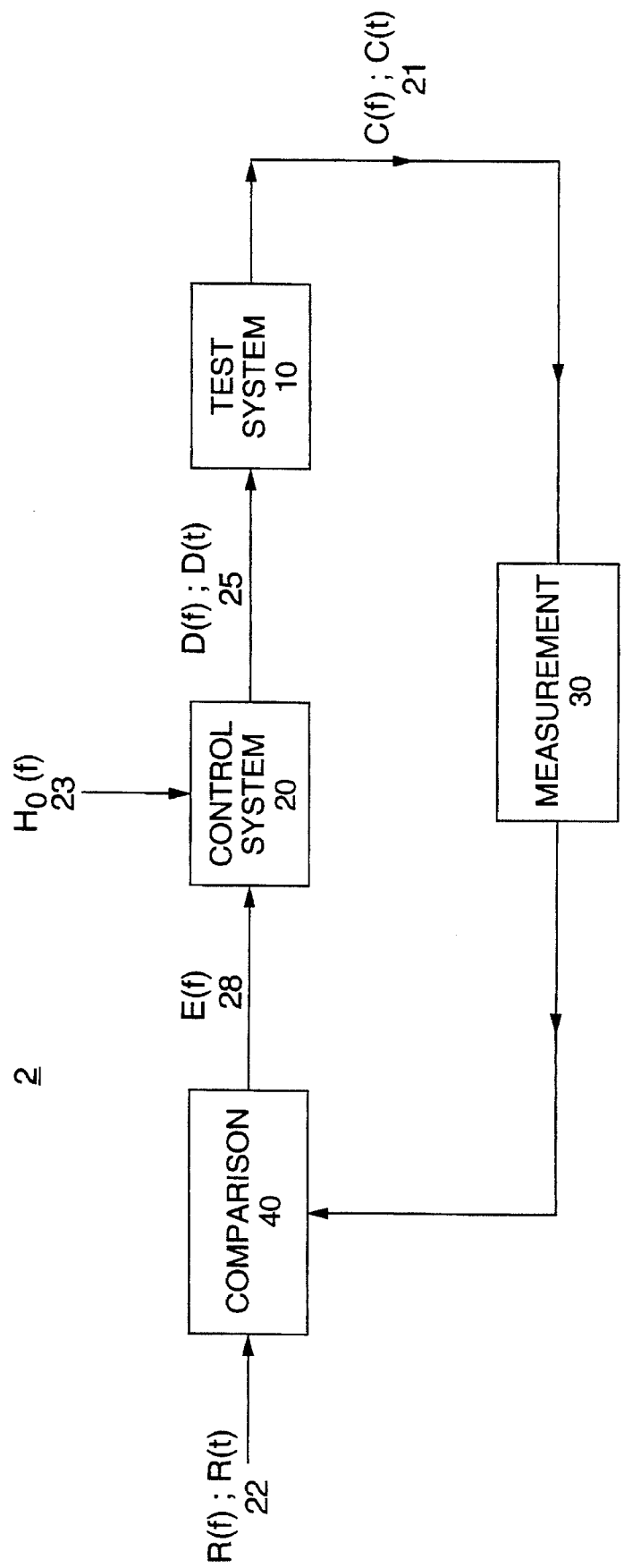
FIG. 2 is a block diagram of a prior art closed loop system suitable for performing vibration testing of a device under test.

FIG. 2 is a block diagram of a prior art closed loop test system 2 suitable for performing vibration testing of a device under test, which is included in test system 10. FIG. 2 is based a similar figure contained in the reference "Modern Control Systems" by Richard C. Dorf, published by Addison-Wesley Publishing Company, Inc. (1967). As in open loop test system 1 of FIG. 1, test system 10 is controlled by control system 20. Closed loop test system 2 also contains measurement means 30 for performing a measurement of response signal 21 and comparison means 40 for comparing measured response signal 21 to desired response signal 22.

The comparison performed by comparison means 40 is represented by error signal 28, which is expressed in the frequency domain as E(f), and is input to control system 20 and used as one basis for updating drive signal 25. An initial estimate $H_o(f)$ of transfer function 23 of test system 10 is also input to control system 20, and provides the basis for generating the initial estimate $D_o(f)$ of drive signal 25, as described by equation (2), and after conversion to a time domain representation, $D_o(t_j)$.

In closed loop test system 2, each updated drive signal 25 is input to test system 10, whose dynamic properties are characterized by a transfer function H(f), thereby producing as an output a new response signal 21. This current response signal 21 is then measured by measurement means 30 and compared with desired response signal 22 by comparison means 40, producing an updated error signal 28. Since the response signal and the desired response signal are expressed in terms of their equivalent voltage representation, the error signal is also expressed in terms of its equivalent voltage representation. Updated error signal 28 then provides one basis for the next update of drive signal 25. Ideally, this process continues until drive signal 25 converges to a drive signal which when applied to test system 10, produces a response signal 21 which is sufficiently close to desired response signal 22. Another way to characterize this situation is to say that error signal 28 approaches zero, i.e., the detection limit of the system.

Test system 2 is termed a "closed loop" system because control system 20 automatically updates drive signal 25 based on the measurement of response signal 21 and its comparison with desired response signal 22. However, control system 20 of test system 2 does not adaptively update the test system's transfer function H(f) to take into account any non-linear or time-dependent behavior of test system 10. Thus control system 20 is not capable of compensating for changes in the dynamics of test system 10. If during the test the response characteristics of the test system vary, the updated values for the drive signal (which are based on the initial estimate of the transfer function) will be in error. This may cause the updates to the drive signal to fail to converge to a drive signal which will produce the desired response signal.

In order to account for changes to the transfer function, and thus to compensate for the changing dynamic properties of test system 10, the present invention uses a closed loop adaptive control system which is capable of updating the drive signal based on knowledge of the present response characteristics of the test system. The present invention utilizes both time domain and frequency domain representations of the drive and response signals, and of some of the quantities involved in updating the drive signals.

The drive signal applied to the test system is a time domain waveform, as is the response signal which is measured. Time domain representations are also used to determine certain intermediate quantities, such as those involved in the calculation of input channel gain and the process of convergence testing, as well as for presentation of results to an operator. Frequency domain representations are used in the present invention for the updating of the test system's transfer function and for other quantities used in updating the drive signal.

Figure 3:
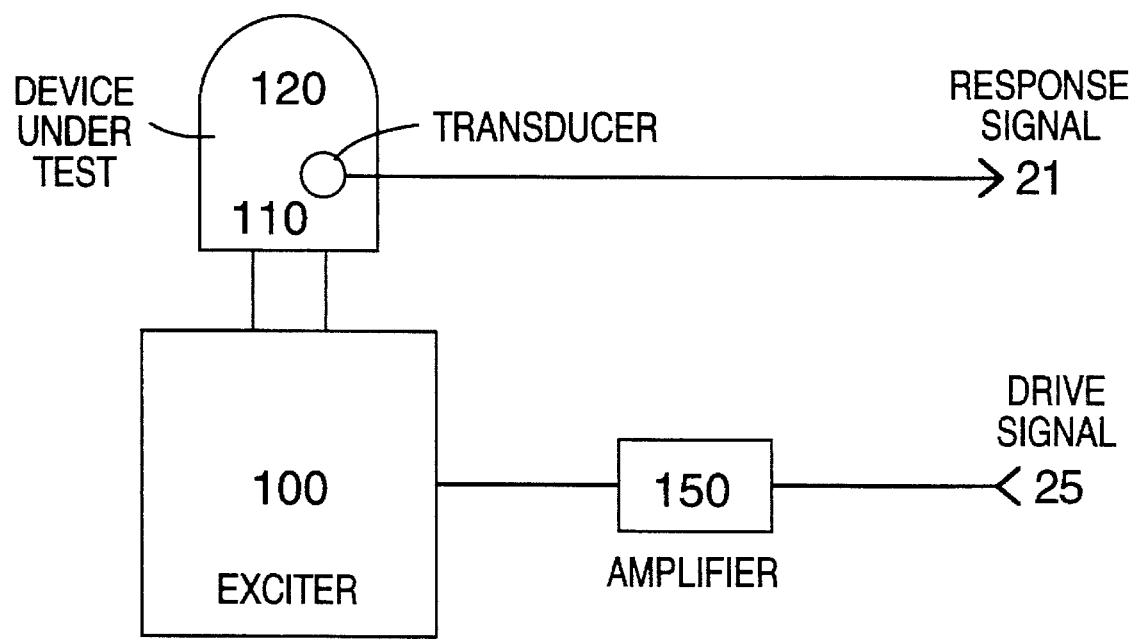
FIG. 3 shows the components of a typical test system which may be used with the control system of the present invention to perform vibration testing of a device under test.

Prior to discussing the details of the control system of the present invention, reference is made to FIG. 3, which shows the components of a typical test system 10 which may be used with the control system of the present invention to perform vibration testing of a device under test. Test system 10 includes a shaker or exciter 100 which imparts a motion determined by drive signal 25 to a device under test 120. Prior to applying drive signal 25 to exciter 100 the signal may be amplified by amplifier 150. The response of device under test 120 to the application of drive signal 25 is measured by transducer 110 which is placed at a point on device 120. The output of transducer 110 is response signal 21.

Adaptive updating of the response characteristics of test system 10 is accomplished by the control system of the present invention, in which an updated transfer function H(f) is based on the previous estimate for the transfer function, the current response signal 21, and the current drive signal 25. The current response signal is the response signal obtained after application of the current iteration of the drive signal. The updated transfer function is then used with the current response signal 21, current drive signal 25, and current coherence function, which is a measure of how well the previous estimate of the transfer function described the dynamic response of the test system, to determine an updated value for the coherence function. The current drive signal, updated coherence function, updated transfer function, current response signal 21, and desired response signal 22 are then used to determine an updated drive signal 25.

As indicated by the previous discussion, the basis of the adaptive shock test control system of the present invention are the operations performed by control system 20 in the process of producing the iterative updates to drive signal 25 through the production of the iterative updates of the test system transfer function. In some embodiments, control system 20 may also perform those operations normally performed by measurement means 30 and comparison means 40. The process of generating the updates to drive signal 25 will now be discussed in detail.

In accordance with the present invention, updated values for the transfer function H(f), the coherence function $\gamma(f)$, and the drive signal are produced by means of an iterative process. The updated transfer function $H(f)_i$ is based on the current transfer function $H(f)_{i-1}$, the current response signal $C(f)_i$, and the drive signal $D(f)_{i-1}$ which produced that response signal. The difference between the indices assigned to the transfer function, response signal, and the drive signal arises because for a given iterative cycle, the transfer function and drive signal are updated subsequent to the measurement of the response signal.

In accordance with the method of the present invention, the updated transfer function $H(f)_i$ is determined from the aforementioned quantities as follows:

$$H(f)_i = (1-\sigma) \cdot H(f)_{i-1} + \sigma \cdot \Psi \ [C(f)_i / D(f)_{i-1}], \qquad (3)$$

where $\sigma$ is an adaptation or weighting factor specified by the user, and $\Psi$ [a/b] is termed a "pseudofunction" of a and b, where a and b are complex numbers. The pseudofunction $\Psi$ of the present invention is defined by:

$$\Psi[a/b] = \begin{cases} a/b & \text{if } |b| > \epsilon \\ 1 & \text{if } |a| < \epsilon \text{ and } |b| < \epsilon \\ 0 & \text{otherwise,} \end{cases} \quad (4)$$

where $\epsilon$ is the control system's noise to signal ratio.

The use of a pseudofunction avoids computational difficulties (i.e., values approaching infinity) which can arise when determining the spectral components of the transfer function. These difficulties can result from attempts to divide by zero or very small numbers, as may occur when a spectral component of the drive or response signal is zero, or when signal strengths fall below the noise level of the system. The use of a pseudofunction thus compensates for errors introduced by the modeling of the control system and test system, by truncating the spectral components of the transfer function in situations in which a computational problem would otherwise develop.

In this sense the pseudofunction "conditions" the value of $[C(f)_i/D(f)_{i-1}]$, which is a voltage ratio, so that a finite value for that quantity can be determined. This resolves one of the computational difficulties which can arise in a control system designed to perform adaptive closed loop updates to the transfer function. As indicated by equation (3), the next iteration of the transfer function is a weighted average of the previous estimate, $H(f)_{i-1}$, and the conditioned value of the quantity $[C(f)_i/D(f)_{i-1}]$, where $\sigma$ serves as the weighting term.

Note that in view of equation (1), the quantity $[C(f)_i/D(f)_{i-1}]$ can be viewed as the current "effective" transfer function for the test system. This is because it is based on the current response signal and the most recent drive signal, that is the drive signal which produced that response signal. Thus equation (1) suggests that this is the transfer function which would be calculated based on the most current values for the drive and response signals.

The behavior of equation (3) as the estimate for the transfer function improves is worth examining and can be determined from its form. As the sequence of transfer function terms, $H(f)_i$, converges to the test system's transfer function, succeeding terms in the sequence will become arbitrarily close. This means that the term $[C(f)_i/D(f)_{i-1}]$ will approach the previous term in the sequence of estimates for the transfer function. In that case equation (3) can be approximated by:

$$H(f)_i \approx (1-\sigma) \cdot H(f)_{i-1} + \sigma \cdot H(f)_{i-1} = H(f)_{i-1}.$$

This indicates that the update equation for the transfer function is well behaved and will continue the convergence of the terms in the sequence of transfer functions.

If the terms are diverging, then the behavior of the pseudofunction dominates the update process:

$$H(f)_i = (1-\sigma) \cdot H(f)_{i-1} + \sigma \quad \text{if } \Psi[a/b] = 1, \text{ or}$$
$$H(f)_i = (1-\sigma) \cdot H(f)_{i-1} \quad \text{if } \Psi[a/b] = 0.$$

This situation results if the terms a and b are both below the noise level, or if the result of performing the operation a/b would produce an infinite value. Either case indicates that the current value of $[C(f)_i/D(f)_{i-1}]$ will not assist the convergence of the sequence and should be discarded.

As can be seen, if the pseudofunction takes on the value of 1 or 0 then the value of the weighting term $\sigma$ becomes especially important. The use of voltage representations of R(f) and C(f), becomes especially important with regards to obtaining a simpler representation of the pseudofunction $\Psi$. This is because of the engineering units representation of R(f) and C(f)$_i$ is used, then the pseudofunction would then take the values transducer-calibration-factor and 0 instead of the simpler 1 and 0 values, in the exceptional cases. The weighting term is specified by the user and is a measure of the quality of the initial estimate of $H_o(f)$. Thus it is an indication of the a priori knowledge the user has regarding the non-linearity or time-dependence of the test system's transfer function. The weighting term can vary in value between 0 and 1, and is usually chosen to be equal to 0.125. This small value means that the iterative updates to the transfer function cause the transfer function to change slowly, i.e., the current effective transfer function is given low weight. This helps to reduce divergence problems as it makes the control system less sensitive to the non-linear behavior of the transfer function. Note that if the transfer function is known to be highly non-linear, i.e., its value changes drastically from cycle to cycle, then a should be set equal to 1.

Equation (3) indicates that determination of the updated transfer function requires knowing the current response signal C(f)$_i$, which is typically provided by means of a FFT analyzer, and the current value for the drive signal, $D(f)_{i-1}$. In order to obtain the values of $D(f)_{i-1}$, a delay means can be used which provides the previous iteration of the drive signal after a delay period corresponding to the time between iterations. In a similar manner, the previous value of the transfer function can be provided by a delay means so that it may be used in updating the transfer function according to equation (3).

The coherence function $\gamma(f)_i$, which serves as a weighting function for the update of the drive signal, and is a measure of the quality of the current estimate of the transfer function, is also iteratively updated by the method of the present invention. This measure indicates how well the current estimate of the transfer function describes the dynamics of the test system, as indicated by the current value of the effective transfer function. The value of the coherence function $\gamma(f)_i$ varies between 0 and 1. A value of zero reflects a poor estimate of the transfer function and one which should not be given much weight. A value of 1 indicates a good estimate of the transfer function, at least within the computational limits of the method.

In accordance with the method of the present invention, the coherence function $\gamma(f)_i$ is updated based on the following relationship:

$$\delta(f)_i = (1-\sigma) \cdot \gamma(f)_{i-1} + \sigma \cdot \Psi^* [|H(f)_i \cdot D(f)_{i-1}|^2/|C(f)_i|^2], \quad (5)$$

where the pseudofunction $\Psi^*$ is defined by $$\Psi^*[a/b] = \begin{cases} a/b & \text{if } |b| > \epsilon \text{ and } (a/b) < 1 \\ b/a & \text{if } |a| > \epsilon \text{ and } (b/a) < 1 \\ 0 & \text{if } |a| < \epsilon \text{ and } |b| < \epsilon \\ 0 & \text{otherwise,} \end{cases} \quad (6)$$

where $\epsilon$ is the control system's noise to signal ratio.

As before, the pseudofunction serves to condition the terms it acts on, as a means of addressing computational problems which might otherwise contribute to the divergence of the control system. The previous update of the coherence function can again be provided by a delay means.

As before when discussing equation (3), the behavior of equation (5) is worth noting. As the sequence of drive signals approaches the desired one, i.e., that which produces the desired response signal, $[D(f)_{i-1}/C(f)_i]$ approaches the inverse of the actual value of the test system transfer function. This means that the sequence of updates for the test system transfer function converges, meaning that the term $[|H(f)_i \cdot D(f)_{i-1}|^2/|C(f)_i|^2]$ approaches a value of 1. In that case the coherence function update takes the form:

$$\gamma(f)_i = (1-\sigma) \cdot \gamma(f)_{i-1} + \sigma.$$

In this case if $\sigma$ is close to 1, the coherence function converges to 1. If $\sigma$ is close to 0, the coherence function converges to its previous value, which if the sequence of transfer function estimates is converging, would again be 1. If the sequence of transfer function estimates is not converging, then the term $[|H(f)_i \cdot D(f)_{i-1}|^2/|C(f)_i|^2]$ would not be approaching 1 and the behavior of the pseudofunction would dominate. This expression for the coherence function estimate is unaffected by the choice of units used to represent $D(f)_{i-1}$ and $C(f)_i$. The obtained coherence estimate is unitless in any case.

The current updated values of the transfer function and coherence function are used as part of the process of generating the updated value for the drive signal. This is accomplished by first determining the iterative change to the drive signal, $\delta D(f)$, according to the following method:

$$\delta D(f) = \alpha \cdot \Psi \bullet (([R(f) - C(f)_i] \cdot [\gamma(f)_i])/[H(f)_i]), \quad (7)$$

where $\alpha$ is a control rate parameter provided by the user, and where $\Psi \bullet [a/b]$ is defined as:

$$\Psi \bullet [a/b] = \begin{matrix} a/b & \text{if } |b| > \epsilon \\ 0 & \text{otherwise,} \end{matrix} \quad (7.1)$$

where $\epsilon$ is the control system's noise to signal ratio. Note that $R(f)$ and $C(f)_i$ are expressed in terms of their voltage representation, and all other quantities are unitless by construction and definition. The control rate parameter serves as a weighting function and represents the feedback gain of the adaptive control system. That is, it determines the relative contribution of the updated transfer function and coherence function to the updated drive signal. It takes on values between 0 and 1 and typically is set to a value of 0.75. This value is larger than that used in many prior art close loop control systems, and its magnitude is indicative of the robustness and relatively well-behaved nature of the method of the present invention.

The iterative change to the drive signal is determined from equation (7) and then used in conjunction with the previous update to the drive signal, $D(f)_{i-1}$, to determine the updated drive signal $D(f)_i$ according to the following relationship:

$$D(f)_i = D(f)_{i-1} + \delta D(f), \quad (8)$$

where $\delta D(f)$ is given by equation (7).

The behavior of equations (7) and (8) determines the next term in the sequence of updates to the drive signal. If the sequence of estimates of the transfer function is converging, then the coherence function is approaching a value of 1. In that case the error signal term, $[R(f) - C(f)_i]$, becomes small, and the new drive signal is approximately equal to the previous one, which corresponds to the desired drive signal.

Similarly, if the sequence of transfer functions is not converging, the coherence function does not approach 1, making the contribution of the $\delta D(f)$ term defined in equation (7) minimal. In this situation the new drive signal is again close to the previous value, though in this case it is because of a lack of faith in the update to the transfer function. If this happens, the drive signal is only slightly adjusted and the iterative process of varying the drive signal continues.

In between these extremes, when the transfer function is slowly converging to the actual test system transfer function, the coherence function takes on intermediate values. This results in a larger change to the drive signal, but one which is modified by later iterations.

The updated drive signal, $D(f)_i$, then becomes the current drive signal and can again be provided to a delay means for use in the next update cycle. The updated drive signal can also be provided to a drive signal synthesis means which performs an Inverse Fourier Transform (IFT) on drive signal $D(f)_i$ in order to convert it to a time domain signal $D(t)_i$. The updated time domain drive signal is then applied to test system 10 by means of an exciter or actuator. This completes one cycle of the iterative process performed by control system 20. The process then repeats itself with the measurement of a new response signal, followed by a repeat of the steps discussed above.

Details of the implementation of the closed loop adaptive control system of the present invention will now be explained with reference to FIG. 4, which is a block diagram of the adaptive control system of the present invention.

Figure 4:
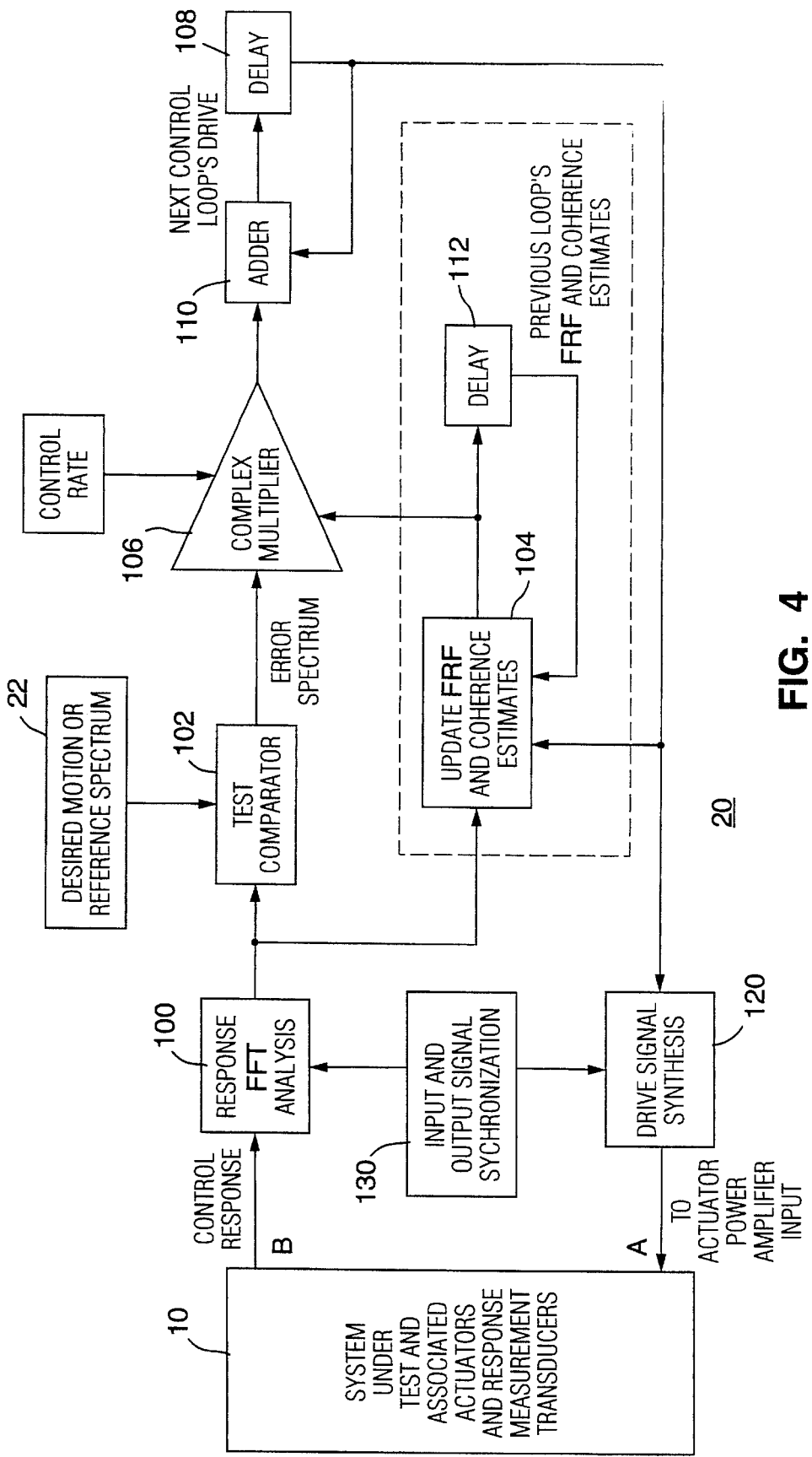
FIG. 4 is detailed block diagram of the adaptive closed loop control system of the present invention.

As depicted in FIG. 4, control system 20 is interfaced to test system 10. As before, test system 10 may include the device under test and any associated actuators (exciters), amplifiers, or transducers which are used to impart a drive signal to a test device and measure the response signal at a point on the test device. A drive signal represented as a time domain voltage waveform, $D(t)$, which is the output of a digital-to-analog converter, is applied to the device under test by means of an exciter or actuator, as indicated at point A in FIG. 4. The response of system under test 10 to the applied drive signal is measured by a transducer and output as a time domain voltage waveform, $C(t)$, which is digitized by an analog-to-digital converter, as indicated at point B.

Control system 20 performs the operations necessary to generate updates to drive signal 25 with the goal of producing a response signal 21 at point B which is sufficiently close to a desired response signal 22. It does so by performing closed loop adaptive updates of the drive signal applied to test system 10 based on measurements of the response signal and generation of an updated transfer function and coherence function. This produces a sequence of drive signals, $D(t)_i$ at A, which correspond to a sequence of response signals $C(t)_i$ measured at B, where the index i represents the current term (that resulting from the operations performed by the control system during the same iterative loop) in the sequence of drive or measured signals.

Given a measured response signal, $C(t)_i$, a Fast Fourier Transform (FFT) is performed on the time domain waveform by means of FFT analyzer 100. This converts the time domain signal $C(t)_i$, into a frequency domain signal which is represented by its frequency components, $C(f)_i$. This response signal, $C(f)_i$, is one of the inputs to comparator 102, which performs a comparison between $C(f)_i$ and desired response signal 22, expressed in its frequency domain representation R(f). $C(f)_i$ is also provided as an input to transfer and coherence function estimate update means 104, the function of which is to implement the previously discussed relationships which determine the updates to the transfer function and coherence function.

Comparator 102 compares inputs $C(f)_i$ and $R(f)$ and produces as an output error signal $E(f)_i$, which is defined in terms of any suitable measure of the relationship between $C(f)_i$ and $R(f)$. A typical measure which is used is the difference between the amplitudes of the spectral components, in which case $E(f)_i$ takes the form:

$$E(f)_i = R(f) - C(f)_i. \quad (9)$$

After calculation by comparator 102, $E(f)_i$, which is in terms of its voltage representation since both $R(f)$ and $C(f)_i$ are assumed to be in terms of their respective voltage representations, is provided as an in to complex multiplier 106. The updated transfer and coherence function estimates provided by update means 104 are also input to complex multiplier 106, as they will be used to determine the update to drive signal 25.

As mentioned, update means 104 produces updated values for the transfer function $H(f)$ and the coherence function $\gamma(f)$. The updated transfer function $H(f)_i$ is determined by update means 104 according to equations (3) and (4). The update is a weighted average of the previous estimate of the test system transfer function and the conditioned value of the current "effective" transfer function for the test system.

Determining the updated transfer function by means of equation (3) requires knowing the current response signal $C(f)_i$, provided by FFT analyzer 100, and the current value for the drive signal, $D(f)_{i-1}$. In order to obtain the values of $D(f)_{i-1}$, delay means 108 is used which provides the previous iteration of the drive signal to update means 104 after a delay period corresponding to the time between iterations. Delay means 108 receives the previous update to the drive signal from adder 110 and holds it for one cycle of the iterative process. In a similar manner, update means 104 receives the previous value of the transfer function from delay means 112 after its production by update means 104 during the previous cycle of the iterative process.

Update means 104 also iteratively updates the coherence function $\gamma(f)_i$, which is a measure of the quality of the current estimate of the transfer function. The update of the coherence function is carried out according to the relationships described in equations (5) and (6). The previous update of the coherence function is provided by delay means Delay means 112 receives the update from update means 104 and delays it for one iterative cycle prior to making it available to update means 104 for the next update of the coherence function.

It is noted that the pseudofunctions used in the updates of the test system transfer function, the coherence function, and the change to the drive signal are defined in terms of the quantity $\epsilon$, the control system's noise to signal ratio. In accordance with the present invention, the value of $\epsilon$ used to evaluate the pseudofunctions is based on the word sizes for the analog-to-digital and digital-to-analog converters used by the control system. For example, it is typical that the word size of the analog-to-digital converter is 12 bits and that of the digital-to-analog converter is 16 bits. If the smallest quantity represented is limited to 31 counts of the analog-to-digital or digital-to-analog converter values, for example, then $\epsilon$ is chosen to be (31/4,095) when the response signal measurement is in terms of analog to digital converter units and (31/65,535) when the drive signal measurement is in terms of digital to analog converter units, for example. The $\epsilon$ chosen when evaluating the pseudofunction for the change to the drive signal is selected to be the limiting control system noise to signal ratio, i.e., the larger of the previously mentioned $\epsilon$ values, when the drive signal measurement is in terms of digital to analog converter units and the response signal measurement is in terms of analog to digital converter units. We note that the Analog-to-Digital converter is what converts $C(t)_i$ from its native voltage units to Analog-to-Digital converter units. The Digital-to-Analog Converter is what converts $D(t)_{i-1}$ from Digital-to-Analog converter back to its native voltage units. The units are converted back and forth, as needed, by using the calibration factors of the Analog-to-Digital converters and Digital-to-Analog converters, with their respective signals. The use of these calibration factors is standard practice, and is assumed as known in the following discussions.

Thus, the value of $\epsilon$ which is used in evaluating the pseudofunctions can depend on what the quantities (a) and (b) in the definition of the pseudofunctions refer to. For instance if the quantity (a) refers to the response signal amplitudes, then the $\epsilon$ corresponding to the control system's noise to signal ratio is based on the analog-to-digital converter's noise to signal ratio. Similarly, if the quantity (b) refers to the drive signal amplitudes, then the $\epsilon$ corresponding to the control system's noise to signal ratio is based on the digital-to-analog converter's noise to signal ratio.

Update means 104 provides the current updated values of the transfer function and coherence function to complex multiplier 106 which uses them as part of the process of generating the updated value for the drive signal. Complex multiplier 106 generates the next term in the sequence of drive signals according to equations (7) and (8). The control rate parameter $\alpha$ of equation (7) is input by the user and provided to complex multiplier 106. Complex multiplier 106 determines $\delta D(f)$ as given by equation (7), and then provides that term to adder 110. Adder 110 uses it in conjunction with the previous update to the drive signal, $D(f)_{i-1}$, provided by delay means 108, to determine the updated drive signal $D(f)_i$, as described by equation (8).

The updated drive signal, $D(f)_i$, then becomes the current drive signal and is provided by adder 110 to delay means 108 for use in the next update cycle. It is also provided to drive signal synthesis means 120 which performs an Inverse Fourier Transform (IFT) on drive signal $D(f)_i$ in order to convert it to a time domain signal $D(t)_i$. The updated time domain drive signal is then applied to test system 10 by means of an exciter or actuator at point A. This completes one cycle of the iterative process performed by control system 20. The process then repeats itself with the measurement of a new response signal at point B, followed by a repeat of the steps discussed above.

An issue of concern during vibration testing is the correlation of measured data (in this case the response signal) with the stimulus which produced it (the drive signal). In order to assure that a particular set of response signal data is that resulting from the application of the current drive signal, input and output signal synchronization means 130 is used. A logic signal is passed between the input and output channels so that the input of data samples at point B is correlated with the drive signal applied at point A which is responsible for producing that set of data. This allows the representation of the previous drive signal, etc., to be provided by delay means 108 and 112 and used in the adaptive control loop, eliminating the need to recalculate those values during the next update cycle.

Figure 5:
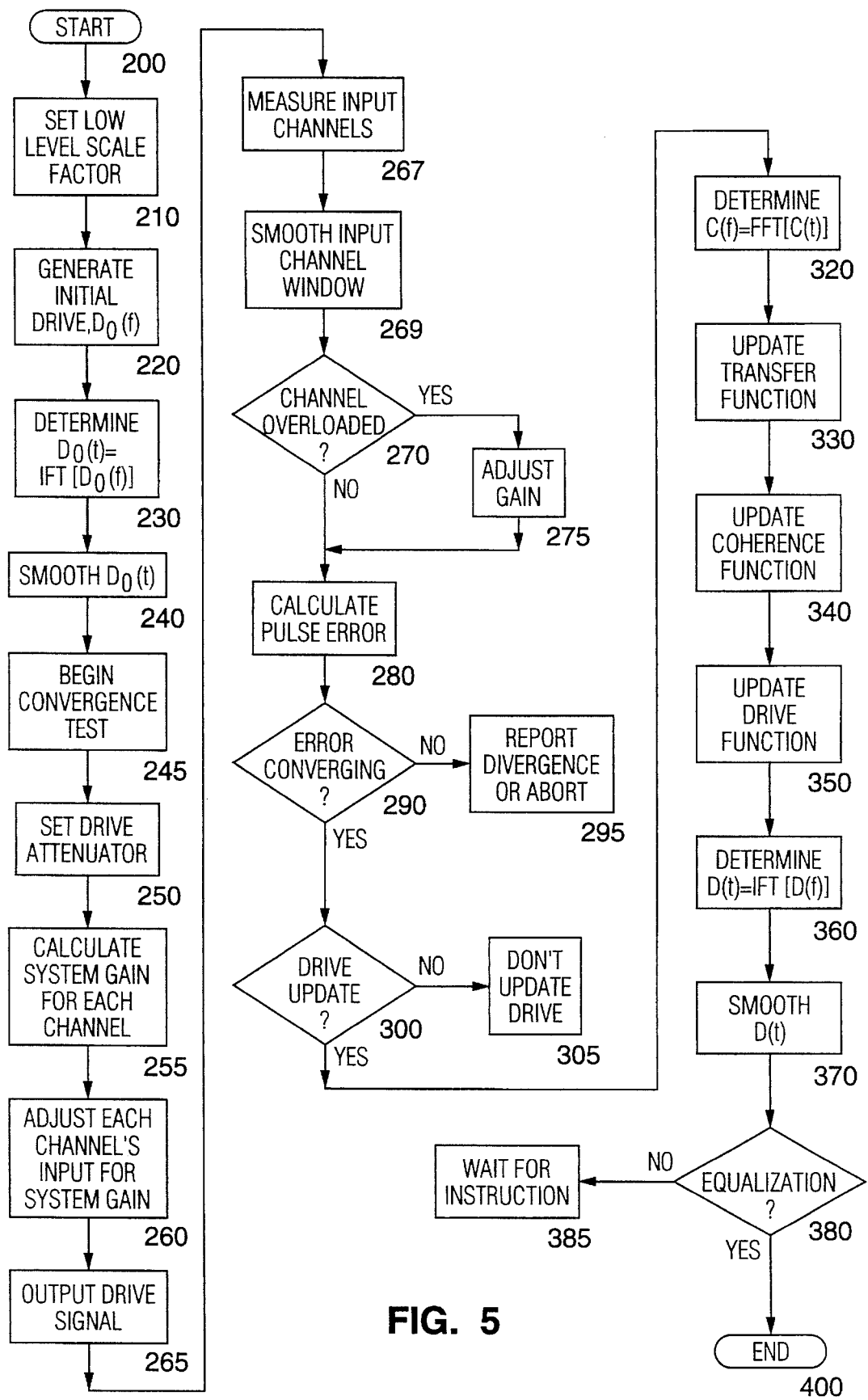
FIG. 5 is a flow-chart depicting the structure of the software which forms part of the adaptive closed loop control system of the present invention.

FIG. 5 is a flow-chart showing the primary functional components of the software which is part of the adaptive control system of the present invention. It is noted that some or all of the operations performed by the software could also be performed by hardware, or a combination of software and hardware.

The adaptive control process begins with start box 200. This operation performs the initialization procedures necessary to run the software. Box 210 indicates the process of determining the scale factor which is used to adjust the drive signals so as to compensate for the low levels used during the first set of iterations. The initial sequence of updates to the drive signal are performed at a low amplitude level in order to prevent the divergence of the sequence (and assist with the convergence to the desired drive signal) as a result of the use of the calibration signal based estimate for the transfer function. After a predetermined number of cycles, i.e., as greater confidence is gained in the estimates of the transfer function, the amplitude is increased by increasing the scale factor. Problems associated with the non-linearity of the test system's transfer function (which might become evident as the amplitude is increased) are avoided by the conditioning feature and weighting operations of the adaptive control process of the present invention.

An initial estimate of the system's response, or transfer function $H_o(f)$ can be obtained by use of a calibration drive signal, such as a white noise signal. Using this known drive signal, the response signal is measured. This provides the estimate for $H_o(f)$, as indicated by equation (1).

The initial drive signal $D_o(f)$ is then determined, based on the desired response signal $R(f)$ and the estimate for $H_o(f)$, as indicated by equation (2). This operation is depicted in box 220. $D_o(f)$ is then converted to a time domain signal, $D_o(t)$, by performing an Inverse Fourier transform (IFT), as depicted by box 230. The time domain signal is then smoothed (compensated) by means of a windowing operation to insure that the waveform is tapered to zero at the beginning and end of the pulse (box 240). This is done so that the actuator to which the drive signal is applied will have the proper initial conditions prior to the application of a new pulse.

For classical pulse waveforms (those used in sine or random testing) this compensation is performed by adding a low level, long duration leading and/or trailing acceleration component to the drive signal so that when the compensated waveform is integrated over its entire period, it yields a final velocity and displacement of zero. The compensation of a shock drive or response signal can be achieved by the addition of a low frequency sinusoidal component, as performed by the GR2518 Vibration Control System produced by the Structural Test Products Division of GenRad, Inc., Milpitas, Calif.

The time domain representation of the initial drive signal (after compensation) will then be applied to the actuator in order to impart the acceleration waveform to the device under test. This begins the iterative process of applying a drive signal, measuring the response signal, C(t), converting the response signal to a frequency domain representation, C(f), and then applying the method of the present invention to update the transfer function and coherence function. These updates provide the basis for producing an update to the drive signal, D(f), which is then converted into a time domain representation and applied to the test system.

After smoothing the initial drive signal, the next step depicted in FIG. 5 is the beginning of the convergence test (box 245). This starts the process of monitoring the convergence or divergence of the test system, and is used as the basis for deciding whether to continue with the testing sequence. The output drive amplitude for the next output pulse is set based on the peak drive amplitude test requirements (box 250). The output drive amplitude is proportional to this setting.

The system gain for each channel is then calculated based on the ratio of each channel's peak amplitude divided by the peak of that control loop's drive amplitude (box 255). Then each input channel's input amplifier is set based on that channel's system gain and the value for the next output pulses' peak amplitude (box 260). This is done according to:

(input level)$_i$=(system gain)$_i$* (peak of next time domain drive signal amplitude), where (system gain)$_i$=(peak time domain input channel response amplitude)$_i$/(peak time domain current input drive signal).

This relationship is evaluated for the current control loop with the index i varying over each input channel. One of the input channels serves as the control channel, and is used in a later step to construct the response signal C(t).

The time domain drive pulse for the next control loop is then output by the control system (box 265). The response signal C(t) is then measured over all of the input channels (box 267). The digitized response signal for each input channel is then smoothed by a windowing operation in the time domain (box 269). This is done to minimize leakage errors in the frequency domain.

Based on the previous measurements, a check is then made to determine if any of the input channels have become overloaded (box 270). If this is the case, the input amplifier setting is adjusted (box 275). The time domain error signal, $E(t)=R(t)-C(t)$, is then calculated for the current control loop, where R(t) is the ideal response signal (box 280). A check is then made to determine if the error signal is diverging (box 290). This is done by examining the behavior of the peak value of $|E(t)|$. If this value is increasing the test is aborted (box 295). If the error signal is not diverging, a check is made to determine whether to update the drive signal (box 300). This decision is within the test operator's discretion. If the update flag has not been set, the control system does not perform an update to the drive signal (box 305).

If there is no divergence of the error signal, the previously measured (box 267) time domain response waveform C(t) is converted to a frequency domain representation, C(f). This is accomplished by means of a Fast Fourier Transform (FFT) (box 320).

The control system then updates the test system transfer function (box 330) according to the method of the present invention. As previously discussed, the update process includes the use of weighting terms and the conditioning of the transfer function in order to prevent the divergence of the adaptive control process. The control system then updates the coherence function (box 340). This process also uses weighting terms and the conditioning of the coherence function in order to prevent potential divergence problems.

The control system then updates the drive signal based on the updated values of the transfer and coherence functions (box 350). The drive signal update also depends on the frequency domain error signal (which is a comparison between the response signal and the desired response signal). The updated drive signal is then converted to a time domain waveform by means of an Inverse Fourier Transform (box 360). The time domain waveform is smoothed (box 370), as was done to the initial drive signal.

The control system then tests to determine if the desired level of test system transfer function equalization has occurred (box 380), based on the previous pulse error calculations (box 280). If the desired degree of equalization has not occurred, the control system suspends further processing and awaits instructions from the operator (box 385). If the desired degree of equalization has occurred, the control system ends the adaptive control process (box 400).

As indicated, one of the parameters used in the present invention is the desired response signal, expressed as a time domain waveform, R(t), or as a frequency domain signal, R(f), where these have been converted to their equivalent voltage representation by the use of the control-transducer's calibration factor, which is in terms of volts per engineering units. The desired response signal may be obtained from measurements of the effect of an actual shock source on the test system, or it may be produced by the computer generation of the signal. The desired response signal waveform R(t) is usually compensated so that at the end of the acceleration pulse the actuator is restored to a condition of zero (or near zero) velocity and displacement. This is the same process mentioned previously during the discussion of the smoothing operation performed on the drive signal updates.

According to the present invention there is presented an apparatus and method for adaptively updating the drive signal used in a shock testing system to determine the response of a test system to a transient vibration. The test system transfer function is iteratively updated to account for changes in the dynamic response of the test system during the test sequence.

The updated transfer function is then used to determine an updated coherence function, which is a measure of how well the transfer function describes the dynamic response of the test system. The coherence function is then used as a weighting function which determines the relative contribution of the current transfer function and error signal to the update of the drive signal.

As the sequence of transfer functions converges to the actual transfer function for the test system, the coherence function approaches a value of 1. As the coherence function approaches 1, the sequence of drive signals converges to that value necessary to reproduce the desired response signal at the control point. In this way variations in the dynamic response of the test system are accounted for, assisting with the conduct of an accurate shock vibration test.

The adaptive control system of the present invention is robust, i.e., not as susceptible to divergence, when compared to existing closed loop control systems used in shock testing. This is a result of the conditioning provided by the use of a pseudofunction, allowing computational difficulties to be addressed. It is also a result of the use of weighting terms which are designed to produce relatively small changes in the transfer function from one cycle to the next. This assists the drive signal to converge to its desired value, and permits the use of actual drive and response signals in the update process. The combination of conditioning of the terms used in the updates and the weighting terms permits the adaptive control system to deal with low signal amplitudes, noise problems, and the nonlinearity or time dependence of the transfer function in an efficient manner and one which is designed to prevent the divergence of the control system.

As a summary, in functional terms the method of the present invention can be described as follows:

Initialization of terms: • Obtain $H_o(f)$, the initial estimate of the test system transfer function from use of a calibration drive signal (such as a white noise signal) and measurements of the system's response to that signal; • Using R(f), the desired response signal, and $H_o(f)$, obtain $D_o(f)$, the initial value of the drive signal; • Convert $D_o(f)$ to $D_o(t)$ and apply the drive signal to the test system; • Measure C(t), the response signal produced by application of the drive signal $D_o(t)$ and convert to c(f); • Obtain $\gamma_o(f)$, the initial estimate of the coherence function based on $H_o(f)$, $D_o(f)$, and C(f). Then begin the cycle of iteratively updating the drive signal: • Update the test system's transfer function according to the method of the present invention; • Update the coherence function according to the method of the present invention; • Update the drive signal according to the method of the present invention; • Convert the drive signal to a time domain waveform and apply it to the system; • Measure the response signal time domain waveform and convert it to a frequency representation of the response signal; • Continue; • End when the sequence of drive signals converges sufficiently, i.e., when the response signal is sufficiently close to the desired response signal.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

I claim:

1. An adaptive closed loop control apparatus for use in the vibrational shock testing of a test system which includes a device under test, the control apparatus supplying a drive signal to the test system in order to produce a desired transient response signal at a designated location on the device under test, wherein a response of the test system to the supplied drive signal is measured at the designated location and can be described by a test system transfer function, the control apparatus comprising:

comparison means for comparing the measured response signal of the test system to the desired transient response signal and producing a measure thereof;

means for producing a closed loop update of the test system transfer function which more accurately describes the test system, the update of the test system transfer function being conditioned so as to prevent its divergence; and means for producing a closed loop update of the drive signal, the update of the drive signal providing a more accurate representation of the drive signal which when applied to the test system will more accurately produce the desired response signal, wherein the updated drive signal depends on the previous drive signal and the measure produced by the comparison means which has been weighted by the update to the test system transfer function.

2. The adaptive closed loop control system of claim 1, further comprising:

means for producing a closed loop update of a coherence function, wherein the coherence function is a measure of the accuracy of the update of the transfer function, the update of the coherence function being conditioned so as to prevent its divergence.

3. The adaptive closed loop control system of claim 2, wherein the updated drive signal $D(f)_i$ is a function of the test system transfer function and the coherence function, and is defined by:

$$D(f)_i = D(f)_{i-1} + \delta D(f),$$

where $D(f)_{i-1}$ is the previous drive signal, and where $\delta D(f)$ is defined by:

$$\delta D(f) = \alpha \cdot \Psi \cdot ((E(f) \cdot [\gamma(f)_i]) / [H(f)_i]),$$

where $\alpha$ is a user specified control rate parameter, E(f) is the measure produced by the comparison means, $\gamma(f)_i$ is the update of the coherence function, $H(f)_i$ is the update of the test system transfer function, and where $\Psi \cdot [a/b]$ serves to condition the quotient [a/b] and is defined by:

$$\Psi \cdot [a/b] = \begin{array}{ll} a/b & \text{if } |b| > \epsilon \\ 0 & \text{otherwise,} \end{array}$$

where $\epsilon$ is the control system's noise to signal ratio.

4. The adaptive closed loop control system of claim 2, wherein the update of the coherence function depends on a previous update of the coherence function and an estimate of the accuracy of the transfer function.

5. The adaptive closed loop control system of claim 4, wherein the update of the coherence function depends on the current drive signal and current response signal.

6. The adaptive control system of claim 5, wherein the update of the coherence function $\gamma(f)_i$ is defined by:

$$\gamma(f)_i = (1-\sigma)\cdot\gamma(f)_{i-1} + \sigma\cdot\Psi^* [|H(f)_i\cdot D(f)_{i-1}|^2/C(f)_i|^2],$$

where $\gamma(f)_{i-1}$ is the previous update of the coherence function, $D(f)_{i-1}$ is the previous drive signal, $C(f)_i$ is the measurement of the response signal, $\sigma$ is a user specified weighting term, and where $\Psi^*$ [a/b] serves to condition the quotient [a/b] and is defined by:

$$\Psi^* [a/b] = \begin{array}{ll} a/b & \text{if } |b| > \epsilon \text{ and } (a/b) < 1 \\ b/a & \text{if } |a| > \epsilon \text{ and } (b/a) < 1 \\ 0 & \text{if } |a| < \epsilon \text{ and } |b| < \epsilon \\ 0 & \text{otherwise,} \end{array}$$

where $\epsilon$ is the control system's noise to signal ratio.

7. The adaptive closed loop control system of claim 1, wherein the update of the test system transfer function depends on a previous update of the transfer function and an estimate of the transfer function.

8. The adaptive closed loop control system of claim 4, wherein the update of the test system transfer function depends on the current drive signal and current response signal.

9. The adaptive closed loop control system of claim 8, wherein the update of the test system transfer function $H(f)_i$ is defined by:

$$H(f)_i = (1-\sigma)\cdot H(f)_{i-1} + \sigma\cdot\Psi [C(f)_i/D(f)_{i-1}],$$

where, $C(f)_i$ is the measurement of the response signal, $\sigma$ is a user specified weighting term, and where $\Psi$ [a/b] serves to condition the quotient [a/b] and is defined by:

$$\Psi [a/b] = \begin{array}{ll} a/b & \text{if } |b| > \epsilon \\ 1 & \text{if } |a| < \epsilon \text{ and } |b| < \epsilon \\ 0 & \text{otherwise,} \end{array}$$

where $\epsilon$ is the control system's noise to signal ratio.

10. An adaptive closed loop control apparatus for use in the vibrational shock testing of a test system which includes a device under test, the control apparatus supplying a drive signal to the test system in order to produce a desired transient response signal at a designated location on the device under test, wherein a response of the test system to the supplied drive signal is measured at the designated location and can be described by a test system transfer function, the control apparatus comprising:

actuator means for applying the drive signal to the test system;

transducer means for measuring the response signal of the test system at a designated location on the device under test;

comparison means for comparing the measured response signal of the test system to the desired transient response signal and producing a measure thereof;

means for producing a closed loop update of the test system transfer function which more accurately describes the test system, the update of the test system transfer function being conditioned so as to prevent its divergence; and means for producing a closed loop update of the drive signal, the update of the drive signal providing a more accurate representation of the drive signal which when applied to the test system will more accurately produce the desired response signal, wherein the updated drive signal depends on the previous drive signal and the measure produced by the comparison means which has been weighted by the update to the test system transfer function.

11. The adaptive closed loop control system of claim 10, further comprising:

means for producing a closed loop update of a coherence function, wherein the coherence function is a measure of the accuracy of the update of the transfer function, the update of the coherence function being conditioned so as to prevent its divergence.

12. The adaptive closed loop control system of claim 11, wherein the updated drive signal $D(f)_i$ is a function of the test system transfer function and the coherence function, and is defined by:

$$D(f)_i = D(f)_{i-1} + \delta D(f),$$

where $D(f)_{1-1}$ is the previous drive signal, and where $\delta D(f)$ is defined by:

$$\delta D(f) = \alpha\cdot\Psi\bullet ((E(f)\cdot [\gamma(f)_i])/[H(f)_i]),$$

where $\alpha$ is a user specified control rate parameter, $E(f)$ is the measure produced by the comparison means, $\gamma(f)_i$ is the update of the coherence function, $H(f)_i$ is the update of the test system transfer function, and where $\Psi\bullet$ [a/b] serves to condition the quotient [a/b] and is defined by:

$$\Psi \bullet [a/b] = \begin{array}{ll} a/b & \text{if } |b| > \epsilon \\ 0 & \text{otherwise,} \end{array}$$

where $\epsilon$ is the control system's noise to signal ratio.

13. The adaptive closed loop control system of claim 11, wherein the update of the coherence function depends on a previous update of the coherence function and an estimate of the accuracy of the transfer function.

14. The adaptive closed loop control system of claim 13, wherein the update of the coherence function depends on the current drive signal and current response signal.

15. The adaptive control system of claim 14, wherein the update of the coherence function $\gamma(f)_i$ is defined by:

$$\gamma(f)_i = (1-\sigma)\cdot\gamma(f)_{i-1} + \sigma\cdot\Psi^* [|H(f)_i\cdot D(f)_{i-1}|^2/C(f)_i|^2],$$

where $\gamma(f)_{i-1}$ is the previous update of the coherence function, $D(f)_{i-1}$ is the previous drive signal, $C(f)_i$ is the measurement of the response signal, $\sigma$ is a user specified weighting term, and where $\Psi^*$ [a/b] serves to condition the quotient [a/b] and is defined by:

$$\Psi^* [a/b] = \begin{array}{ll} a/b & \text{if } |b| > \epsilon \text{ and } (a/b) < 1 \\ b/a & \text{if } |a| > \epsilon \text{ and } (b/a) < 1 \\ 0 & \text{if } |a| < \epsilon \text{ and } |b| < \epsilon \\ 0 & \text{otherwise,} \end{array}$$

where $\epsilon$ is the control system's noise to signal ratio.

16. The adaptive closed loop control system of claim 10, wherein the update of the test system transfer function depends on a previous update of the transfer function and an estimate of the transfer function.

17. The adaptive closed loop control system of claim 16, wherein the update of the test system transfer function depends on the current drive signal and current response signal.

18. The adaptive closed loop control system of claim 17, wherein the update of the transfer function $H(f)_i$ is defined by:

$$H(f)_i = (1-\sigma) \cdot H(f)_{i-1} + \sigma \cdot \Psi\, [C(f)_i / D(f)_{i-1}],$$

where, $C(f)_i$ is the measurement of the response signal, $\sigma$ is a user specified weighting term, and where $\Psi\,[a/b]$ serves to condition the quotient $[a/b]$ and is defined by:

$$\Psi\,[a/b] = \begin{cases} a/b & \text{if } |b| > \epsilon \\ 1 & \text{if } |a| < \epsilon \text{ and } |b| < \epsilon \\ 0 & \text{otherwise,} \end{cases}$$

where $\epsilon$ is the control system's noise to signal ratio.

19. A method of performing adaptive closed loop control for the purpose of conducting a vibrational shock test of a test system which includes a device under test, the controller supplying a drive signal to the test system in order to produce a desired transient response signal at a designated location on the device under test, wherein a response of the test system to the supplied drive signal is measured at the designated location and can be described by a test system transfer function, the method comprising:

comparing the measured response signal of the test system to the desired transient response signal and producing a measure thereof;

producing a closed loop update of the test system transfer function which more accurately describes the test system, the update of the test system transfer function being conditioned so as to prevent its divergence; and producing a closed loop update of the drive signal, the update of the drive signal providing a more accurate representation of the drive signal which when applied to the test system will more accurately produce the desired response signal, wherein the updated drive signal depends on the previous drive signal and the measure produced by the comparison means which has been weighted by the update to the test system transfer function.

20. The method of claim 19, further comprising the step of:

producing a closed loop update of a coherence function, wherein the coherence function is a measure of the accuracy of the update of the transfer function, the update of the coherence function being conditioned so as to prevent its divergence.

21. The method of claim 20, wherein the updated drive signal $D(f)_i$ is a function of the test system transfer function and the coherence function, and is defined by:

$$D(f)_i = D(f)_{i-1} + \delta D(f),$$

where $D(f)_{i-1}$ is the previous drive signal, and where $\delta D(f)$ is defined by:

$$\delta D(f) = \alpha \cdot \Psi \bullet ((E(f) \cdot [\gamma(f)_i]) / [H(f)_i]),$$

where $\alpha$ is a user specified control rate parameter, $E(f)$ is the measure produced by the comparison means, $\delta(f)_i$ is the update of the coherence function, $H(f)_i$ is the update of the test system transfer function, and where $\Psi\bullet\,[a/b]$ serves to condition the quotient $[a/b]$ and is defined by:

$a/b$ if $|b| > \epsilon \Psi\bullet\,[a/b] = 0$ otherwise, where $\epsilon$ is the control system's noise to signal ratio.

22. The method of claim 20, wherein the update of the coherence function depends on a previous update of the coherence function and an estimate of the accuracy of the transfer function.

23. The method of claim 22, wherein the update of the coherence function depends on the current drive signal and current response signal.

24. The method of claim 23, wherein the update of the coherence function $\gamma(f)_i$ is defined by:

$$\gamma(f)_i = (1-\sigma) \cdot \gamma(f)_{i-1} + \sigma \cdot \Psi^* \,[|H(f)_i \cdot D(f)_{i-1}|^2 / |C(f)_i|^2],$$

where $\gamma(f)_{i-1}$ is the previous update of the coherence function, $D(f)_{i-1}$ is the previous drive signal, $C(f)_i$ is the measurement of the response signal, $\sigma$ is a user specified weighting term, and where $\Psi^*\,[a/b]$ serves to condition the quotient $[a/b]$ and is defined by:

$$\Psi^*\,[a/b] = \begin{cases} a/b & \text{if } |b| > \epsilon \text{ and } (a/b) < 1 \\ b/a & \text{if } |a| > \epsilon \text{ and } (b/a) < 1 \\ 0 & \text{if } |a| < \epsilon \text{ and } |b| < \epsilon \\ 0 & \text{otherwise,} \end{cases}$$

where $\epsilon$ is the control system's noise to signal ratio.

25. The method of claim 19, wherein the update of the transfer function depends on a previous update of the transfer function and an estimate of the transfer function.

26. The method of claim 25, wherein the update of the transfer function depends on the current drive signal and current response signal.

27. The method of claim 26, wherein the update of the transfer function $H(f)_i$ is defined by:

$$H(f)_i = (1-\sigma) \cdot H(f)_{i-1} + \sigma \cdot \Psi\, [C(f)_i / D(f)_{i-1}],$$

where, $C(f)_i$ is the measurement of the response signal, $\sigma$ is a user specified weighting term, and where $\Psi\,[a/b]$ serves to condition the quotient $[a/b]$ and is defined by:

$$\Psi\,[a/b] = \begin{cases} a/b & \text{if } |b| > \epsilon \\ 1 & \text{if } |a| < \epsilon \text{ and } |b| < \epsilon \\ 0 & \text{otherwise,} \end{cases}$$

where $\epsilon$ is the control system's noise to signal ratio.

28. A method of performing adaptive closed loop control for the purpose of conducting a vibrational shock test of a test system which includes a device under test, the controller supplying a drive signal to the test system in order to produce a desired transient response signal at a designated location on the device under test, wherein a response of the test system to the supplied drive signal is measured at the designated location and can be described by a test system transfer function, the method comprising:

applying the drive signal to the test system;

measuring the response signal of the test system at a designated location on the device under test;

comparing the measured response signal of the test system to the desired transient response signal and producing a measure thereof;

producing a closed loop update of the test system transfer function which more accurately describes the test system, the update of the test system transfer function being conditioned so as to prevent its divergence; and producing a closed loop update of the drive signal, the update of the drive signal providing a more accurate representation of the drive signal which when applied to the test system will more accurately produce the desired response signal, wherein the updated drive signal depends on the previous drive signal and the measure produced by the comparison means which has been weighted by the update to the test system transfer function.

29. The method of claim 28, further comprising:
producing a closed loop update of a coherence function, wherein the coherence function is a measure of the accuracy of the update of the transfer function, the update of the coherence function being conditioned so as to prevent its divergence.

30. The method of claim 29, wherein the updated drive signal $D(f)_i$ is a function of the test system transfer function and the coherence function, and is defined by:

$$D(f)_i = D(f)_{i-1} + \delta D(f),$$

where $D(f)_{i-1}$ is the previous drive signal, and where $\delta D(f)$ is defined by:

$$\delta D(f) = \alpha \cdot \Psi \bullet ((E(f) \cdot [\gamma(f)_i])/[H(f)_i]),$$

where $\alpha$ is a user specified control rate parameter, $E(f)$ is the measure produced by the comparison means, $\delta(f)_i$ is the update of the coherence function, $H(f)_i$ is the update of the test system transfer function, and where $\Psi \bullet [a/b]$ serves to condition the quotient $[a/b]$ and is defined by:

$a/b$ if $|b| > \epsilon \Psi \bullet [a/b] = 0$ otherwise, where $\epsilon$ is the control system's noise to signal ratio.

31. The method of claim 30, wherein the update of the transfer function depends on a previous update of the transfer function and an estimate of the transfer function.

32. The method of claim 31, wherein the update of the transfer function depends on the current drive signal and current response signal.

33. The method of claim 32, wherein the update of the transfer function $H(f)_i$ is defined by:

$$H(f)_i = (1-\sigma) \cdot H(f)_{i-1} + \sigma \cdot \Psi \ [C(f)_i/D(f)_{i-1}],$$

where, $C(f)_i$ is the measurement of the response signal, $\sigma$ is a user specified weighting term, and where $\Psi \ [a/b]$ serves to condition the quotient $[a/b]$ and is defined by:

$$\Psi \ [a/b] = \begin{matrix} a/b & \text{if } |b| > \epsilon \\ 1 & \text{if } |a| < \epsilon \text{ and } |b| < \epsilon \\ 0 & \text{otherwise,} \end{matrix}$$

where $\epsilon$ is the control system's noise to signal ratio.

34. The method of claim 29, wherein the update of the coherence function depends on a previous update of the coherence function and an estimate of the accuracy of the transfer function.

35. The method of claim 34, wherein the update of the coherence function depends on the current drive signal and current response signal.

36. The method of claim 35, wherein the update of the coherence function $\gamma(f)_i$ is defined by:

$$\gamma(f)_i = (1-\sigma) \cdot \gamma(f)_{i-1} + \sigma \cdot \Psi^* \ [|H(f)_i \cdot D(f)_{i-1}|^2 / |C(f)_i|^2],$$

where $\gamma(f)_{i-1}$ is the previous update of the coherence function, $D(f)_{i-1}$ is the previous drive signal, $C(f)_i$ is the measurement of the response signal, $\sigma$ is a user specified weighting term, and where $\Psi^* \ [a/b]$ serves to condition the quotient $[a/b]$ and is defined by:

$a/b$ if $|b| > \epsilon$ and $(a/b) < 1$ $\Psi^* \ [a/b] = b/a$ if $|a| > \epsilon$ and $(b/a) < 1$ $0$ if $|a| < \epsilon$ and $|b| < \epsilon$ $0$ otherwise, where $\epsilon$ is the control system's noise to signal ratio.

* * * * *